(12) United States Patent
Iijima

(10) Patent No.: US 7,744,119 B2
(45) Date of Patent: Jun. 29, 2010

(54) AIRBAG DEVICE AND AIRBAG FOR SADDLE-RIDE TYPE VEHICLE

(75) Inventor: Satoshi Iijima, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 12/320,691

(22) Filed: Feb. 2, 2009

(65) Prior Publication Data
US 2009/0218791 A1    Sep. 3, 2009

(30) Foreign Application Priority Data
Feb. 29, 2008    (JP)    ............... 2008-051139

(51) Int. Cl.
*B60R 21/16* (2006.01)
(52) U.S. Cl. ................... 280/730.1
(58) Field of Classification Search ............. 280/728.2, 280/743.1, 730.1; *B60R 21/16*
See application file for complete search history.

(56) References Cited

U.S. PATENT DOCUMENTS

| | | | |
|---|---|---|---|
| 7,104,568 B2 * | 9/2006 | Miyata | 280/730.1 |
| 7,198,287 B2 * | 4/2007 | Miyata | 280/730.1 |
| 7,213,831 B2 * | 5/2007 | Miyata | 280/728.2 |
| 7,566,070 B2 * | 7/2009 | Miyata | 280/730.1 |
| 2004/0207182 A1 | 10/2004 | Miyata | |
| 2005/0023803 A1 | 2/2005 | Kuroe et al. | |
| 2007/0284857 A1 * | 12/2007 | Miyata | 280/728.2 |

FOREIGN PATENT DOCUMENTS

| | | |
|---|---|---|
| DE | 198 18 490 (A1) | 11/1998 |
| EP | 1043196 (A2) | 10/2000 |
| JP | 09-263205 (A) | 10/1997 |
| JP | 2000108974 A * | 4/2000 |
| JP | 2001-219885 A | 8/2001 |
| JP | 2003-237661 A | 8/2003 |
| JP | 2005001507 A * | 1/2005 |
| JP | 2007-314117 | 12/2007 |

OTHER PUBLICATIONS

European Search Report dated Feb. 4, 2009.

* cited by examiner

*Primary Examiner*—Faye M. Fleming
(74) *Attorney, Agent, or Firm*—Squire, Sanders & Dempsey L.L.P.

(57) ABSTRACT

An airbag device and an airbag for a saddle-ride type vehicle is provided to efficiently utilize space in the vehicle body when installed therein, by using customized ways of shaping a housing case of the airbag and of folding the airbag so as to correspond to the shape of the housing case. The airbag device includes a housing case. The housing case includes a concave shape surface. The concave shape surface faces a steering stem. The housing case is disposed behind the steering stem so as to cover a rear of the steering stem with the concave shape surface. The airbag device includes an airbag housed in the housing case. The housed airbag corresponds to a shape of an inner peripheral surface of the housing case having the concave shape surface.

14 Claims, 7 Drawing Sheets

FRONT SIDE OF VEHICLE BODY (a)    (b)

(a)    (b)

FRONT SIDE OF VEHICLE BODY

FRONT SIDE OF VEHICLE BODY

AIRBAG DEVICE AND AIRBAG FOR SADDLE-RIDE TYPE VEHICLE

FIELD

The embodiments discussed herein relate to an airbag device and an airbag for a saddle-ride type vehicle. More particularly, the some of the embodiments relates to an airbag device and an airbag for a saddle-ride type vehicle which are capable of efficiently utilizing space in the vehicle body when installed therein, by using customized ways of shaping a housing case of the airbag and of folding the airbag to correspond to the shape of the housing case.

BACKGROUND

An airbag device is designed to absorb kinetic energy of a driver when a vehicle body receives an impact of a predetermined value or more. Heretofore, studies have been made on how and where to appropriately arrange such an airbag device in a motorcycle, the airbag device integrally housing components such as a folded airbag and an inflator for inflating and deploying the airbag.

Patent Document 1 (Japanese Patent Application Publication No. 2007-314117) generally discusses a structure for a scooter-type motorcycle in which a low-slung foot rest for the rider is formed between a steering handlebar and a rider seat. In the structure discussed in Patent Document 1, an airbag device is installed so as to be housed inside a cover member arranged upright on the front side of the low-slung foot rest in a front-rear direction of the vehicle body so as to cover the spindle of the steering handlebar.

However, because the airbag device needs to inflate and deploy the airbag in front of the rider at a proper position, a motorcycle, in particular, does not have many location possibilities for installing the airbag device. Additionally, wasted space may be created around the housing, when a housing case of the airbag is made to have, for example, a substantially rectangular-solid shape and is installed in a vehicle body of the motorcycle. Accordingly, the shape of the housing case and its installing position still need to be devised in order to further efficiently install the airbag device. Furthermore, there exists a problem in folding the airbag so that the airbag can be efficiently housed in the housing case. Patent Document 1 does not really take such issues into account.

SUMMARY

According to one of the embodiments discussed herein, an airbag device is provided for a saddle-ride type vehicle. The airbag device may include a housing case. The housing case can include a concave shape surface that may face a steering stem and may be disposed behind the steering stem so as to cover a rear of the steering stem with the concave shape surface. The airbag device can may includes an airbag housed in the housing case. The housed airbag may correspond to a shape of an inner peripheral surface of the housing case having the concave shape surface.

According to another embodiment, an airbag for an airbag device is provided for a saddle-ride type vehicle. The airbag can include a left edge, a right edge, a front edge, and a rear edge. Both the left and right edges of the airbag may be folded in one of an accordion-folded manner and a rolling manner leaving a predetermined dimension in the vehicle width direction between left and right folded parts so that the size of the airbag in a vehicle width direction when the airbag is installed in a vehicle can be reduced. Both the front and rear edges of the airbag may be folded in one of an accordion-folded manner and a rolling manner so that the size of the airbag in a front-rear direction of a vehicle body can be reduced. A portion of the airbag, where the predetermined dimension is left after being folded, may be formed to be bendable as a flexible part.

According to another embodiment, a method for an airbag device is provided for a saddle-ride type vehicle. The method can include providing a housing case. The housing case can include a concave shape surface. The method can include arranging the housing case behind a steering stem of the saddle-ride type vehicle so as to cover a rear of the steering stem with the concave shape surface. The method can include housing an airbag in the housing case. The housed airbag can correspond to a shape of an inner peripheral surface of the housing case having the concave shape surface.

According to another embodiment, a method of folding an airbag is provided for an airbag device in a vehicle. The method can include folding a left edge of an airbag and a right edge of the airbag in one of an accordion-folded manner and a rolling manner, while leaving a predetermined dimension in the vehicle width direction between left and right folded parts so that the size of the airbag in a vehicle width direction may be reduced when the airbag is installed in the vehicle. The method can include folding a front edge of the airbag and a rear edge of the airbag in one of an accordion-folded manner and a rolling manner so that the size of the airbag in a front-rear direction of a vehicle body is reduced. The method can include forming a portion of the airbag, where the predetermined dimension is left after being folded, to be bendable as a flexible part.

According to another embodiment, an airbag device may be provided for a vehicle. The airbag device may include an airbag means for protecting a rider of the vehicle. The airbag device may include a housing means for housing said airbag means. The housing means may include a concave shape surface that can face a steering stem and is can be configured to be behind the steering stem so as to cover a rear of the steering stem with the concave shape surface. The airbag means corresponds to a shape of an inner peripheral surface of the housing means having the concave shape surface.

Figure 5:
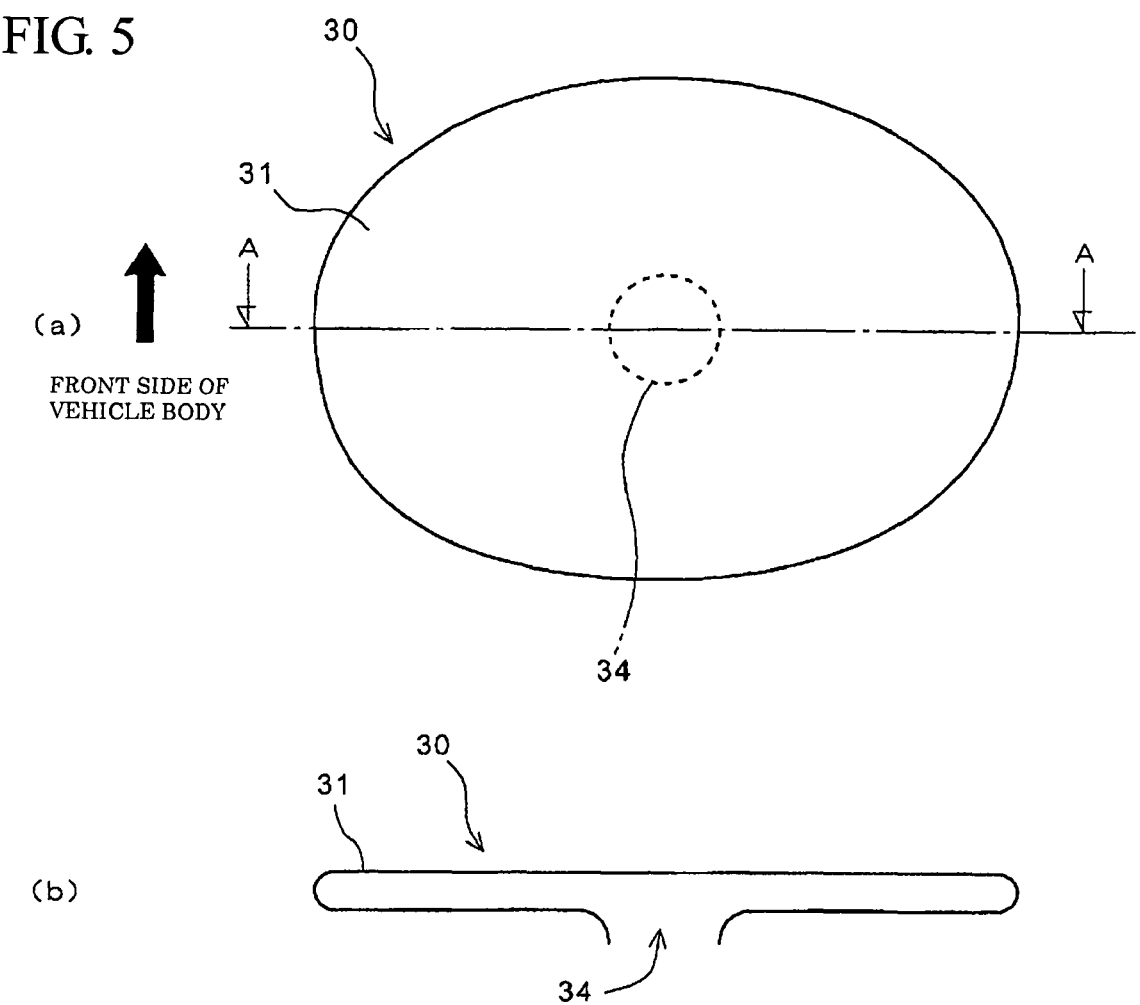

Part (a) of FIG. 5 is a top view of a bag body of the airbag in a contracted state, and Part (b) of FIG. 5 is a cross-sectional view taken along the line A-A in Part (a) of FIG. 5.

Figure 6:
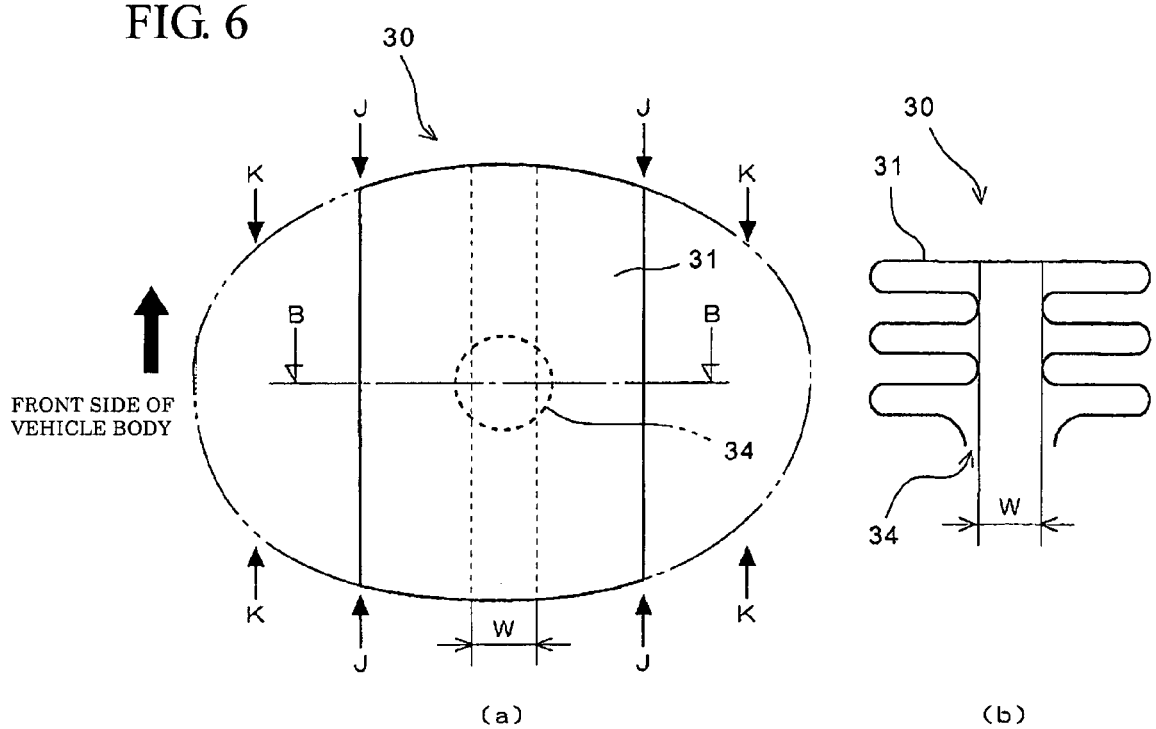

Part (a) of FIG. 6 is a top view of the bag body being folded in a first step, and Part (b) of FIG. 6 is a cross-sectional view taken along the line B-B in Part (a) of FIG. 6.

Figure 7:
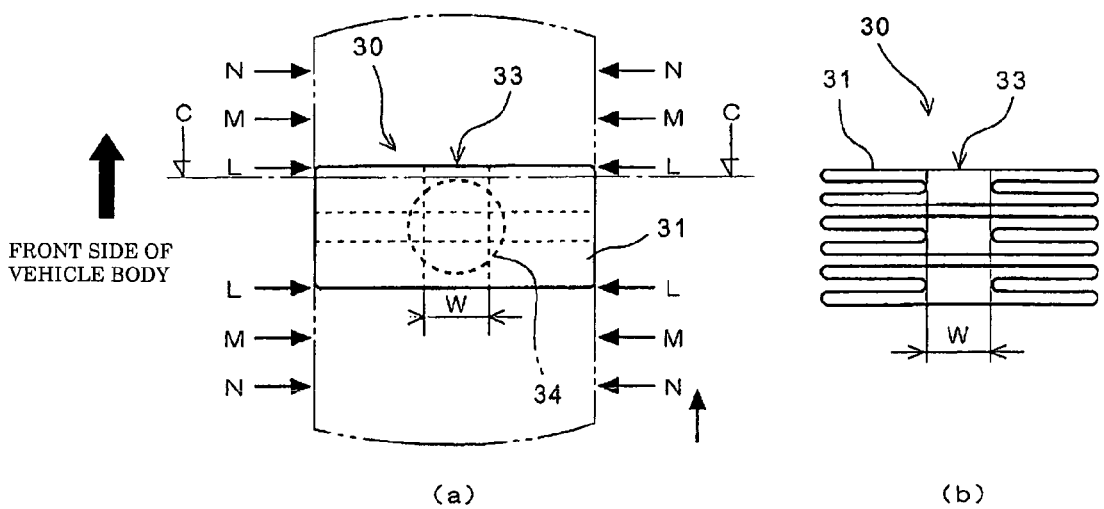

Part (a) of FIG. 7 is a top view of the bag body being folded in a second step, and Part (b) of FIG. 7 is a cross-sectional view taken along the line C-C in Part (a) of FIG. 7.

Figure 8:
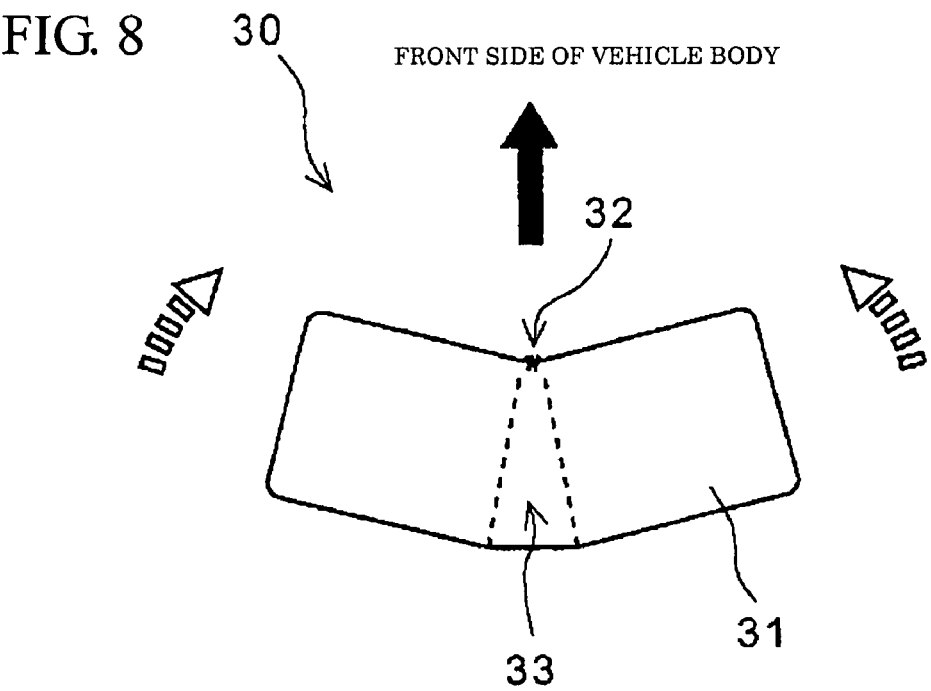

FIG. 8 is a top view of the bag body being bent in a third step.

Figure 9:
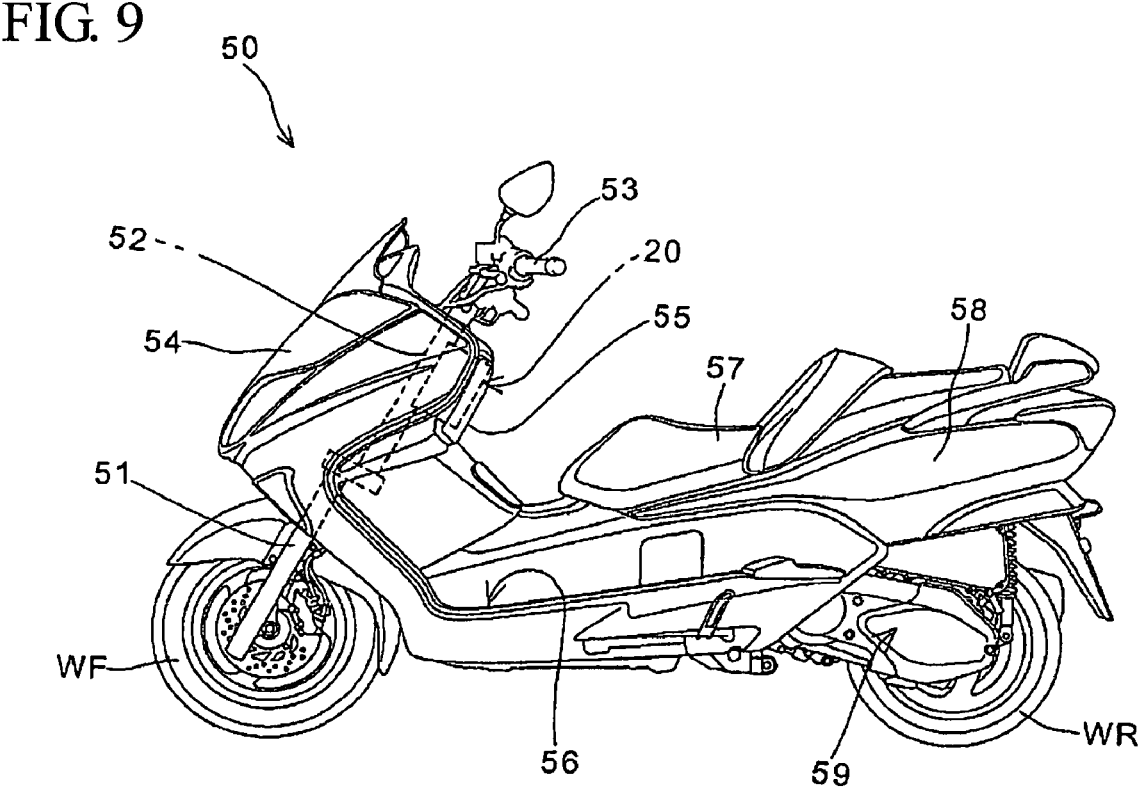

FIG. 9 is a side view of a scooter-type motorcycle in which the airbag device is installed according to the embodiment discussed herein.

Figure 10:
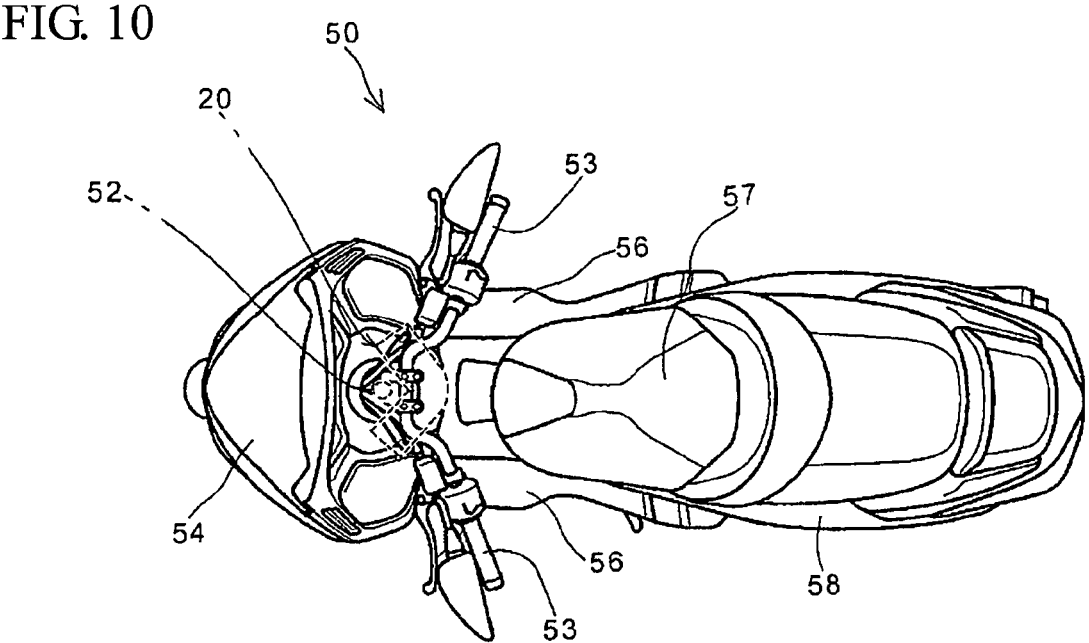

FIG. 10 is a top view of the scooter-type motorcycle.

Figure 11:
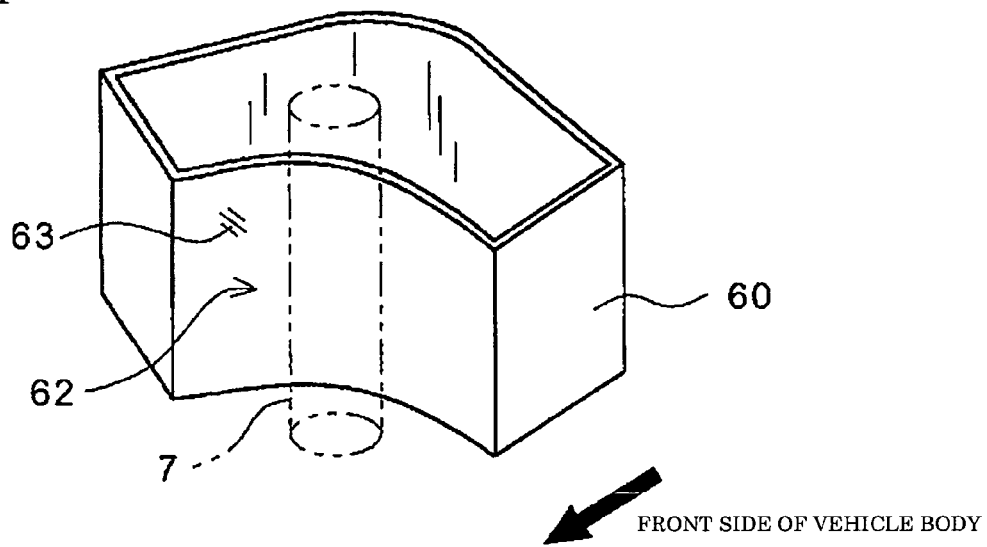

FIG. 11 is a perspective view of a housing case according a modification of the embodiment discussed herein.

DESCRIPTION OF THE PREFERRED EMBODIMENTS

Figure 1:
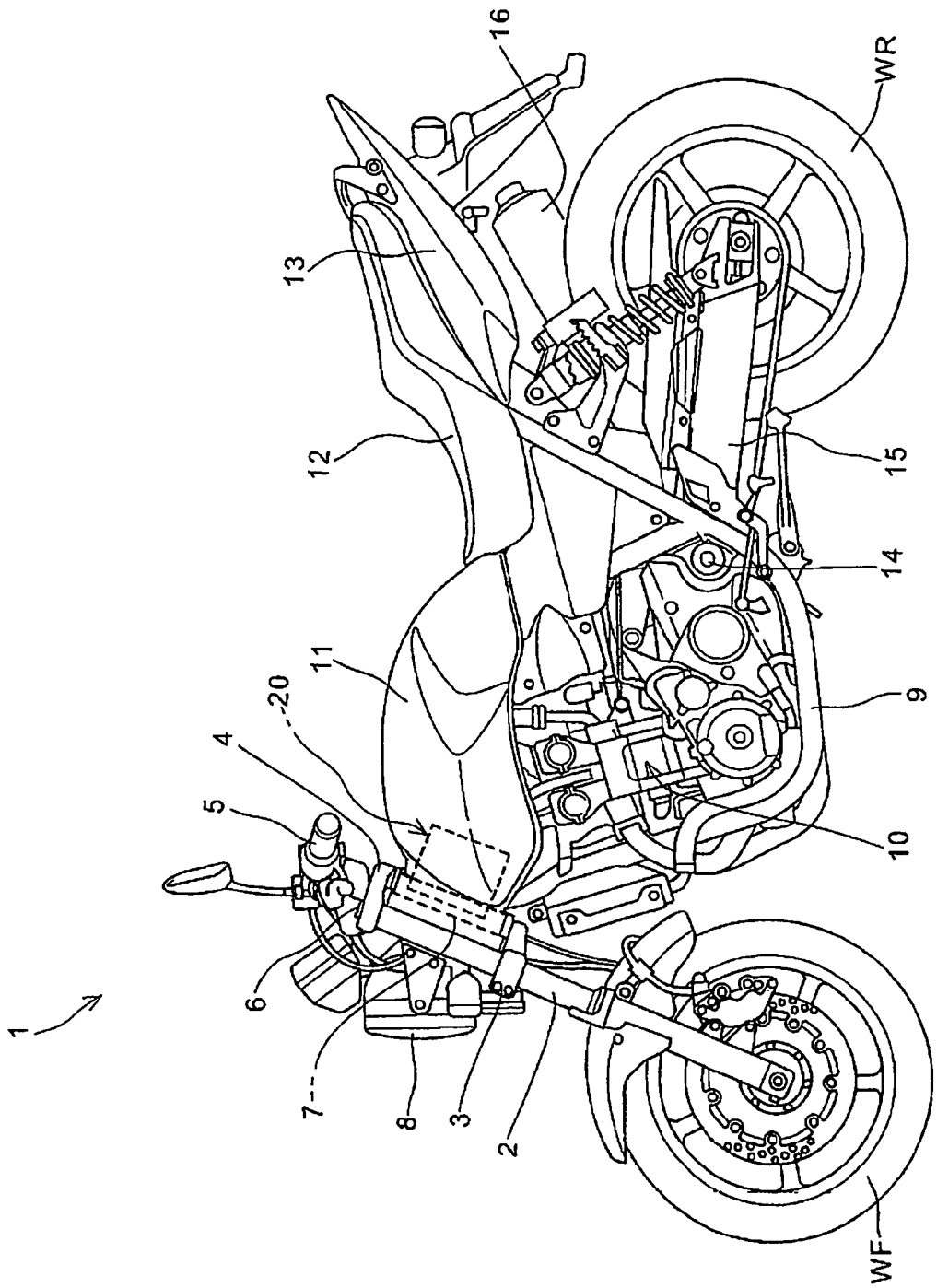
FIG. 1 is a side view of a motorcycle in which an airbag device is installed according to an embodiment discussed herein.
Figure 2:
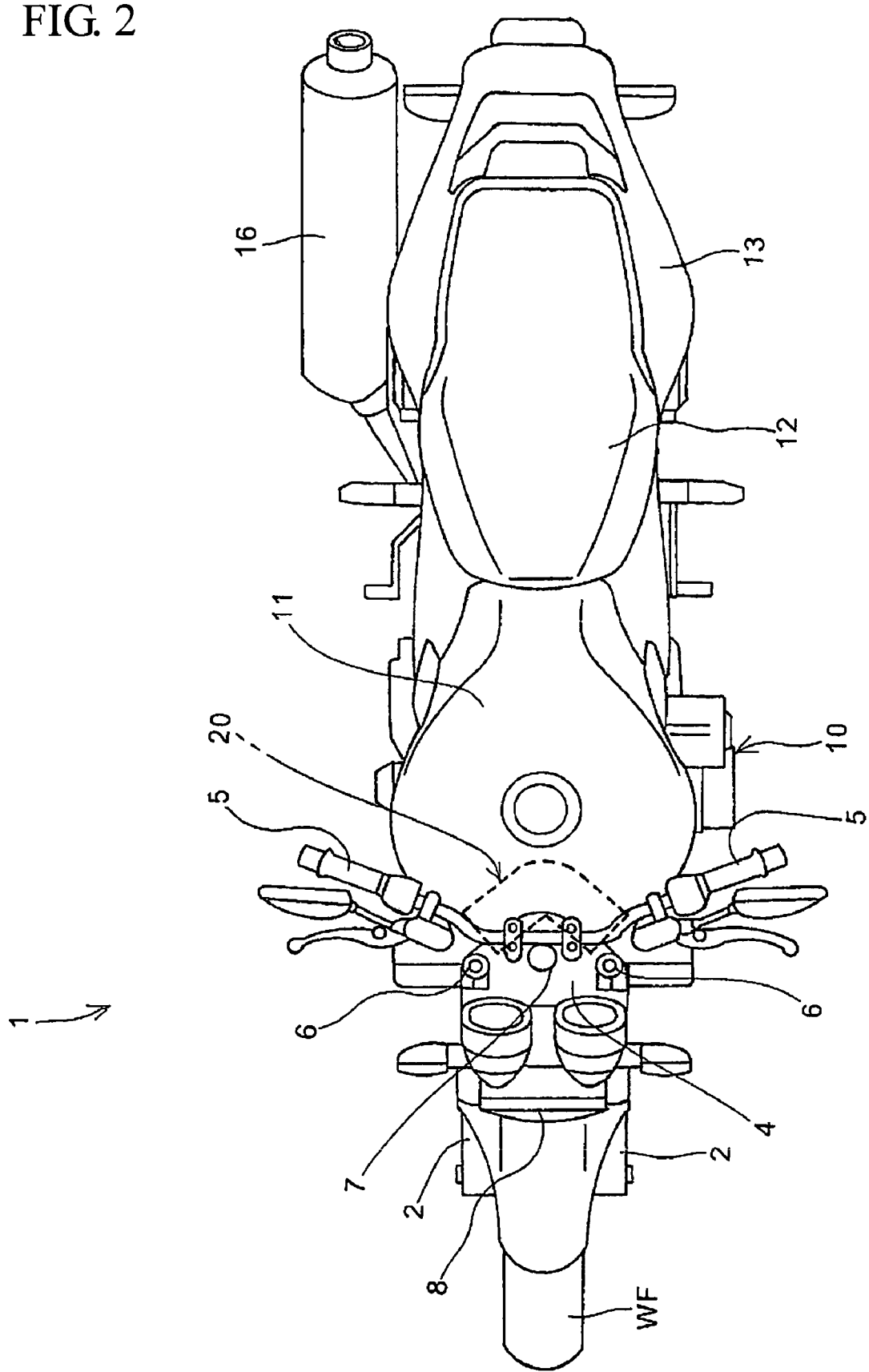
FIG. 2 is a top view of the motorcycle.

Some of the preferred embodiments will be described in detail with reference to the accompanying drawings. FIG. 1 illustrates a side view of a motorcycle 1 in which an airbag device can be installed according to an embodiment discussed herein. FIG. 2 illustrates a top view of the motorcycle 1. Paired left and right front forks 2 may be held by a top bridge 4 arranged near top end portions 6 of the front forks 2, and by a bottom bridge 3 arranged at middle portions thereof. A front wheel WF may be pivotally supported by the front forks 2 so as to be rotatable. A steering stem 7 having a substantially columnar shape may be fixed between the top bridge 4 and the bottom bridge 3. The steering stem 7 may be inserted into an unillustrated head pipe arranged to the front of a body frame 9, and may be pivotally supported so as to be rotatable. A steering handlebar 5 may be fixed to the top bridge 4. The steering stem 7 may be arranged at the center of the vehicle body in the vehicle width direction so as to incline to the rear of the vehicle body. A headlight device 8 may be attached to the front side of the steering stem 7 in a front-rear direction of the vehicle body (hereinafter simply referred to as the front-rear direction).

An engine 10, serving as a driving source of the motorcycle 1, may be suspended from the body frame 9. A fuel tank 11 may be arranged above the engine 10. A swingarm pivot 14 may be arranged in the lower rear of the body frame 9. The swingarm pivot 14 pivotally supports an end of a swingarm 15, while allowing the swingarm 15 to swing. A rear wheel WR, which can be a driving wheel, may be pivotally supported by the swingarm 15 so as to be rotatable. A rider seat 12 may be attached behind the fuel tank 11 in the front-rear direction. A seat cowl 13, which can be an exterior component, may be arranged under the rider seat 12. Combustion gas from the engine 10 may pass through an exhaust pipe extending toward the rear of the vehicle body, and may then be discharged from a muffler 16 located at the rear of the vehicle body.

The motorcycle 1 according to the present embodiment may be provided with an airbag device to absorb kinetic energy of the rider when the vehicle body receives an impact of a predetermined value or more. An airbag device (airbag module) 20 may include components such as an airbag, an inflator for inflating and deploying the airbag, and a housing case for housing the airbag and the inflator. The airbag device 20 may be installed behind the steering stem 7 in the front-rear direction.

Figure 3:
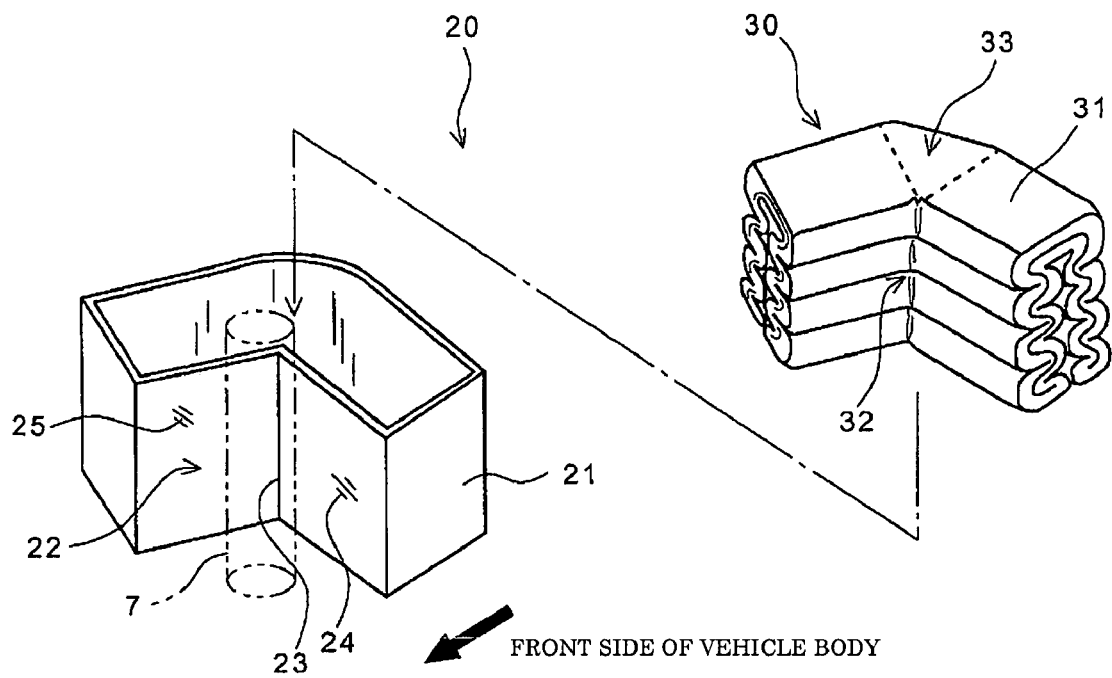
FIG. 3 is an exploded perspective view of the airbag device.
Figure 4:
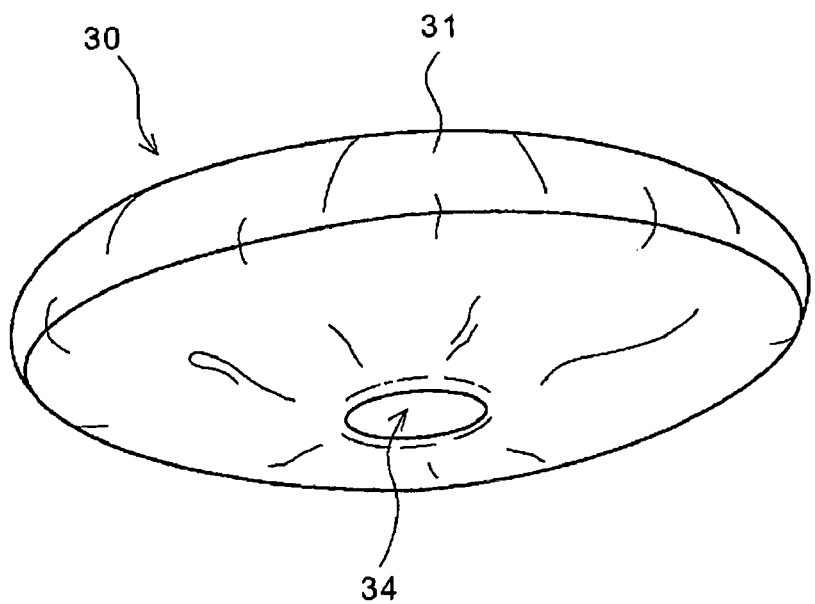
FIG. 4 is a perspective view of an airbag before being folded.

FIG. 3 illustrates an exploded perspective view of the airbag device 20. FIG. 4 illustrates a perspective view of an airbag 30 before being folded. The airbag device 20 may be configured such that a housing case 21 may be able to house components such as the folded airbag 30 and the unillustrated inflator. The housing case 21 may be shaped like a box and may be formed of a thin plate made of a metal, resin, or the like. The airbag 30 may be formed of a cloth-like bag body 31 provided with an opening 34 through which a gas may be introduced from the inflator into the bag body 31.

An unillustrated lid member may be attached to an opening of the housing case 21 after the airbag 30 and the like are housed in the housing case 21. The airbag device 20 may be configured to operate in the following way. Specifically, once an acceleration sensor (not illustrated) or the like, which can be installed in the motorcycle 1, detects that the vehicle body has received an impact of a predetermined value or more, the inflator can be ignited and may introduce gas into the bag body 31 through the opening 34. As pressure from the gas is introduced, the bag body 31 expands while breaking the lid member and other fragile parts of the exterior components. As a result, the bag body 31 can be inflated and deployed in front of the rider.

The front side of the housing case 21 of the airbag device 20 may be formed of a concave-shaped concave part 22. The concave part 22 may be formed by outer shells 24 and 25 which intersect each other at the center of the concave part 22 in the vehicle width direction. The outer shells 24 and 25 may be formed so as to be in contact with each other while having a predetermined angle of nip at a center line 23. The center line 23 can be substantially parallel to the axial direction of the steering stem 7 when the airbag device 20 is installed in the vehicle body. Note that the center line 23 does not need to be in parallel with the axial direction.

The airbag device 20 may be arranged close to the rear of the steering stem 7 in the front-rear direction so that the concave part 22 of the housing case 21 covers the steering stem 7. With this arrangement, the airbag device 20 can be arranged close to the steering stem 7 by efficiently utilizing the spaces on the left and right sides of the steering stem 7 in the vehicle width direction as well as the space behind the steering stem 7, as compared to a case, for example, where the housing case is formed to have a rectangular-solid shape by forming the outer shells 24 and 25 on the same plane and by thus not forming the concave part. Accordingly, an increase in size of the vehicle body can be suppressed by efficiently arranging the airbag device 20 in the vehicle body of the motorcycle having little excess room. Incidentally, the concave part 22 may be formed as if being bent at the center line 23 to be convex toward the rear of the housing case 21 in the front-rear direction, thereby being formed of two surfaces: the outer shells 24 and 25. Therefore, as shown in FIG. 2, when viewed from above the vehicle body, the outer shells 24 and 25 almost look like a letter V.

The motorcycle 1 according to the present embodiment has a structure in which the fuel tank 11 may be arranged between the steering handlebar 5 and the rider seat 12. For this reason, when the airbag device 20 is arranged behind the steering stem 7 in the front-rear direction, the capacity of the fuel tank 11, in particular, is likely to be reduced. However, the degree of the reduction can be constrained to a minimum by shaping and arranging the housing case 21 in the manner described above to efficiently utilize the space in the motorcycle 1.

The airbag 30 may be formed into such a shape as to be housed in the housing case 21, by folding the contracted bag body 31 multiple times. In the present embodiment, the concave part 22 may be formed in the housing case 21. Accordingly, the airbag 30 may be folded into such a shape so as to correspond to the shape of the housing case 21. The airbag 30 according to the present embodiment may be characterized by being bent at a bending part 32 to be convex toward the rear of the folded airbag 30 in the front-rear direction, so as to fit to the shape of the concave part 22. The bending operation at the bending part 32 may be facilitated by the formation of a flexible part 33 in the airbag 30. This flexible part 33 may be created in the airbag 30 by folding the bag body 31 in the way to be described below referring to FIGS. 5 to 8. To be more specific, the flexible part 33 may be the portion where the bag body 31 overlaps fewer times.

Part (a) of FIG. 5 illustrates a top view of the bag body 31 of the airbag 30 in a contracted state, and Part (b) of FIG. 5 illustrates a cross-sectional view taken along the line A-A in Part (a) of FIG. 5. Meanwhile, Part (a) of FIG. 6 illustrates a top view of the bag body 31 being folded in the first step, and Part (b) of FIG. 6 illustrates a cross-sectional view taken along the line B-B in Part (a) of FIG. 6. The first step is performed to reduce the dimension of the contracted bag body 31 in a direction perpendicular to the front-rear direction of the vehicle body. In other words, the folding is performed in the left-right direction, as illustrated in the figure. In the present embodiment, both of the left and right edges of the bag body 31 in the left-right direction in the figure are accordion-folded by alternately doing a mountain fold and a valley fold at folding positions J and K. At this time, the bag body 31 may be folded while leaving a predetermined dimension W at its center in the vehicle width direction, so that the accordion-folded parts may be formed respectively on both sides of the predetermined dimension W.

Part (a) of FIG. 7 illustrates a top view of the bag body 31, having folded in the first step, being further folded in a second step, and Part (b) of FIG. 7 illustrates a cross-sectional view taken along the line C-C in Part (a) of FIG. 7. The second step is performed to reduce the size of the bag body 31, having been folded in the first step, in the front-rear direction of the vehicle body. In other words, the folding is performed in the up-down direction, as illustrated in the figure. In the present embodiment, both of the front and rear edges of the bag body 31 in the up-down direction in the figure are accordion-folded by alternately doing a mountain fold and a valley fold at folding positions L, M, and N. Completion of the second step yields the formation of the flexible part 33 where the bag body 31 overlaps fewer times. The width of the flexible part 33 corresponds to the predetermined dimension W left in the first step.

FIG. 8 illustrates a top view of the bag body 31, having folded in the second step, being further bent in a third step. The third step is performed to bend the airbag 30 so as to be convex toward the rear of the folded airbag 30 in the front-rear direction. As previously mentioned, since the bag body 31 overlaps fewer times at the flexible part 33, the airbag 30 may be bent easily by being deformed to squash the flexible part 33. Completion of the third step yields the formation of the bending part 32 in the front of the bag body 31 in the front-rear direction.

Referring back to FIG. 3, by employing the above-described method for folding the airbag 30, the bag body 31 of the airbag 30 may be easily made to have a shape approximate to the inner space of the housing case 21. This may allow the bag body 31 to be housed in the housing case 21 more efficiently by reducing the gap between the bag body 31 and the inner wall of the housing case 21. Accordingly, the airbag device 20 can be further reduced in size.

In the embodiment described above, the airbag 30 may be accordion-folded at its both ends in the first and second steps. Alternatively, the airbag 30 may be folded in a rolling manner by being rolled in from the edges.

The airbag device 20 according to one the embodiments may not be limited to the motorcycle 1 shown in FIGS. 1 and 2, and can be installed not only in the motorcycle 1 shown in FIGS. 1 and 2, but also in other various types of motorcycles. FIG. 9 illustrates a side view of a scooter-type motorcycle 50 in which a low-slung foot rest 56 for the rider may be formed between a steering handlebar 53 and a rider seat 57. FIG. 10 illustrates a top view of the motorcycle 50.

The motorcycle 50 has a structure in which a steering stem 52 may be pivotally supported at the front edge of a body frame (not illustrated) so as to be rotatable. The steering stem 52 may be arranged at the center of the vehicle body in the vehicle width direction so as to incline to the rear of the vehicle body. A generally-cylindrical head pipe (not illustrated) may be formed at a location where the steering stem 52 is pivotally supported on the vehicle body frame, and the steering stem 52 may be inserted into this head pipe. The steering handlebar 53 may be attached to an upper part of the steering stem 52, whereas paired left and right front forks 51 may be supported on a lower part of the steering stem 52. A front wheel WF may be pivotally supported by the front forks 51 so as to be rotatable. A unit swing 59 formed integrally with an engine may be attached on the rear side of the low-slung foot rest 56. A rear wheel WR may be pivotally supported by the unit swing 59 so as to be rotatable. A seat cowl 58 may be attached behind the rider seat 57.

In this scooter-type motorcycle 50, a cover member 55 may be arranged to stand upright at the front side of the low-slung foot rest 56 in the front-rear direction, and may cover the steering stem 52 from behind in the front-rear direction. The airbag device 20 may be arranged so as to be housed inside the cover member 55. In a scooter-type motorcycle in which space for the feet is formed between the steering handlebar 53 and the rider seat 57, space may need to be created inside the cover member 55 by moving the cover member 55 backward to attach the airbag device 20 inside the cover member 55. However, the shape and arrangement of the housing case in the above-described way allows the moving of the cover member 55 to be constrained to a minimum amount. Accordingly, the airbag device 20 can be attached inside the cover member 55 by efficiently utilizing the space inside the cover member 55.

FIG. 11 illustrates a perspective view of a housing case 60 according to a modification of the embodiment discussed herein. A concave part 62 of the housing case 60 may be formed of an outer shell 63 having a curved surface which curves to be convex toward the rear of the housing case 60 in the front-rear direction. When viewed from above, the outer shell 63 forming the concave part 62 almost looks like a letter U. As a result, the formation of the concave part 62 may allow the airbag device to be arranged close to the steering stem by efficiently utilizing the spaces on the left and right sides of the steering stem in the vehicle width direction as well as the space behind the steering stem. It should be noted that the shape of the rear part of the housing case may not be limited to that in the above-described embodiment, but can be variously changed.

As described above, according to the airbag device for a motorcycle of one of the embodiments, a part, facing the steering stem, of the outer shell of the housing case of the airbag device may be formed into the concave part. Furthermore, the airbag device may be installed so that this concave part covers the rear of the steering stem in the front-rear direction. Accordingly, the airbag device can be installed while efficiently utilizing the spaces on the left and right sides of the steering stem in the vehicle width direction as well as the space behind the steering stem. As a result, an increase in size of the vehicle body can be suppressed by efficiently arranging the airbag device in the vehicle body of the motorcycle having little excess room.

Note that the shapes of the body frame and the steering stem of the motorcycle, the bag body of the airbag, the shape and material of the housing case, and the like may not be limited to those in the above-described embodiments, and may be changed variously. For example, the concave part of the housing case may be shaped to have a planar bottom part. Also, instead of giving a concave shape to the entire front part of the housing case, the concave shape may be given only to a portion covering the rear of the steering stem in the front-rear direction. In addition, the airbag device according to at least one of the embodiments may be employed not only in the above-described motorcycle, but also in saddle-ride type three- and four-wheeled vehicles having a steering mechanism in which the steering stem is a rotatable shaft.

According to one embodiment discussed herein, an airbag device may be installed in a saddle-ride type vehicle in which a steering stem for holding a front wheel may be pivotally supported at a front of a body frame. The airbag device may include a housing case and an airbag housed in the housing case. Moreover, in the airbag device, the housing case may have a surface formed into a concave shape, the surface may be facing the steering stem. The housing may be arranged behind the steering stem so as to cover a rear of the steering stem with the concave surface. The airbag may be housed so as to correspond to a shape of an inner peripheral surface of the housing case having the surface formed into the concave shape.

According to another embodiment, the surface of the housing case, which may be formed into the concave shape, may be composed of two surfaces intersecting each other at a center of the surface in a vehicle width direction.

According to another embodiment, the surface of the housing case, which may be formed into the concave shape, may be curved surface.

According to another embodiment, the airbag may be folded by performing the following method. The method may include folding both left and right edges of the airbag in any one of an accordion-folded manner and a rolling manner. The folding may leaving a predetermined dimension in the vehicle width direction between left and right folded parts so that the size of the airbag in the vehicle width direction may be reduced. The method may also include folding both front and rear edges of the airbag, having been folded in the first step, in any one of an accordion-folded manner and a rolling manner so that the size of the airbag in a front-rear direction of a vehicle body may be reduced. In addition, the airbag may be housed in the housing case by being bent at a flexible part formed at a portion where the predetermined dimension is left after being folded in the first and second steps.

According to another embodiment, an airbag for an airbag device for a saddle-ride type vehicle. The airbag may be folded by performing the following method. The method may include folding both left and right edges of the airbag in any one of an accordion-folded manner and a rolling manner. The folding may leave a predetermined dimension in the vehicle width direction between left and right folded parts so that the size of the airbag in a vehicle width direction, when the airbag is installed in a vehicle, is reduced. The method also includes folding both front and rear edges of the airbag, having been folded in the first step, in any one of an accordion-folded manner and a rolling manner, so that the size of the airbag in a front-rear direction of a vehicle body may be reduced. In addition, a portion where the predetermined dimension is left after being folded in the first and second steps may be formed to be bendable as a flexible part.

According to another embodiment, the housing case may have the surface formed into the concave shape, the surface may face the steering stem. The housing may be arranged behind the steering stem so as to cover the rear of the steering stem with the concave surface. The airbag may be housed so as to correspond to the shape of the inner peripheral surface of the housing case having the surface formed into the concave shape. Thus, the airbag device can be installed by efficiently utilizing the spaces on the left and right sides of the steering stem in the vehicle width direction as well as the space behind the steering stem. As a result, an increase in size of a vehicle body can be suppressed by efficiently arranging the airbag device in the vehicle body of the motorcycle having little excess room. Moreover, the airbag can be housed in the housing case with improved efficiency.

According to another embodiment, the surface of the housing case formed into the concave shape may be composed of the two surfaces intersecting each other at the center of the surface in the vehicle width direction. Thus, the housing case can be obtained in which the concave part formed therein is almost shaped like a letter V when viewed from the top of the vehicle. As a result, the airbag device can be arranged closer to the steering stem.

According to another embodiment, the surface of the housing case formed into the concave shape is the curved surface. Thus, the housing case can be obtained in which the concave part formed therein is almost shaped like a letter U when viewed from the top of the vehicle. As a result, the airbag device can be arranged closer to the steering stem.

According to another embodiment, the airbag may be folded by performing the following method. The method may include folding both left and right edges of the airbag in any one of an accordion-folded manner and a rolling manner. The folding may leave a predetermined dimension in the vehicle width direction between left and right folded parts so that the size of the airbag in the vehicle width direction is reduced. The method may also include folding both front and rear edges of the airbag, having been folded in the first step, in any one of an accordion-folded manner and a rolling manner so that the size of the airbag in a front-rear direction of a vehicle body is reduced. In addition, the airbag may be housed in the housing case by being bent at the flexible part formed at the portion where the predetermined dimension is left after being folded in the first and second steps. Accordingly, the airbag can be housed in the housing case having the concave part with improved efficiency so that the airbag device can be reduced in size.

According to another embodiment, the airbag may be folded by performing the following method. The method may include folding both left and right edges of the airbag in any one of an accordion-folded manner and a rolling manner. The folding may leave the predetermined dimension in the vehicle width direction between left and right folded parts so that the size of the airbag in a vehicle width direction when the airbag is installed in a vehicle is reduced. The method may also include folding both front and rear edges of the airbag, having been folded in the first step, in any one of an accordion-folded manner and a rolling manner so that the size of the airbag in a front-rear direction of a vehicle body is reduced. In addition, the portion where the predetermined dimension is left after being folded in the first and second steps may be configured so as to be bendable as the flexible part. Accordingly, the airbag that can be housed in the housing case having the concave part with improved efficiency can be obtained.

The above-described embodiments are not the only form of the airbag device for a saddle-ride type vehicle according to the embodiments discussed herein. Various other configurations can be employed for the airbag device without departing from the spirit and scope of the embodiments discussed herein.

The metes and bounds of the embodiments are defined only by the appended claims.

EXPLANATION OF THE REFERENCE NUMERALS

1 MOTORCYCLE
2 FRONT FORK
5 STEERING HANDLEBAR
7 STEERING STEM

9 BODY FRAME
11 FUEL TANK
20 AIRBAG DEVICE
21 HOUSING CASE
22 CONCAVE PART
23 CENTER LINE
24, 25 OUTER SHELL (PLANE)
30 AIRBAG
31 BAG BODY
32 BENDING PART
33 FLEXIBLE PART
WF FRONT WHEEL

I claim:

1. An airbag device for a saddle-ride type vehicle, the airbag device comprising:
   a housing case including a concave shape surface, the concave shape surface facing a steering stem, and is disposed behind the steering stem so as to cover a rear of the steering stem with the concave shape surface; and
   an airbag housed in the housing case, wherein
   the housed airbag corresponds to a shape of an inner peripheral surface of the housing case having the concave shape surface.

2. The airbag device for a saddle-ride type vehicle according to claim 1, wherein the concave shape surface of the housing case comprises two surfaces intersecting each other at a center of the concave shape surface in a vehicle width direction.

3. The airbag device for a saddle-ride type vehicle according to claim 1, wherein the concave shape surface of the housing case comprises a curved surface.

4. The airbag device for a saddle-ride type vehicle according to claim 1, wherein the airbag further comprises a left edge, a right edge, a front edge, and a rear edge,
   wherein both the left and right edges of the airbag are folded in one of an accordion-folded manner and a rolling manner leaving a predetermined dimension in a vehicle width direction between left and right folded parts so that the size of the airbag in the vehicle width direction is reduced,
   wherein both the front and rear edges of the airbag are folded in one of an accordion-folded manner and a rolling manner so that the size of the airbag in a front-rear direction of a vehicle body is reduced, and
   wherein the airbag is housed in the housing case by being bent at a flexible part formed at a portion where the predetermined dimension is left after being folded.

5. An airbag for an airbag device for a saddle-ride type vehicle, the airbag comprising:
   a left edge, a right edge, a front edge, and a rear edge,
   wherein both the left and right edges of the airbag are folded in one of an accordion-folded manner and a rolling manner leaving a predetermined dimension in the vehicle width direction between left and right folded parts so that the size of the airbag in a vehicle width direction when the airbag is installed in a vehicle is reduced, and
   wherein both the front and rear edges of the airbag are folded in one of an accordion-folded manner and a rolling manner so that the size of the airbag in a front-rear direction of a vehicle body is reduced, and
   a portion, where the predetermined dimension is left after being folded, is formed to be bendable as a flexible part.

6. A method for providing an airbag device for a saddle-ride type vehicle, the method comprises:
   providing a housing case comprising a concave shape surface;
   arranging the housing case behind a steering stem of the saddle-ride type vehicle so as to cover a rear of the steering stem with the concave shape surface; and
   housing an airbag in the housing case,
   wherein the housed airbag corresponds to a shape of an inner peripheral surface of the housing case having the concave shape surface.

7. The method according to claim 6, further comprising:
   configuring the concave shape surface of the housing case to comprise two surfaces intersecting each other at a center of the surface in a vehicle width direction.

8. The method according to claim 6, further comprising:
   configuring the concave shape surface of the housing case to comprise a curved surface.

9. The method according to claim 6, further comprising:
   folding a left edge and a right edge of the airbag in one of an accordion-folded manner and a rolling manner leaving a predetermined dimension in a vehicle width direction between left and right folded parts so that a size of the airbag in the vehicle width direction is reduced when the airbag is installed in a vehicle;
   folding a front edge and rear edge of the airbag in one of an accordion-folded manner and a rolling manner so that the size of the airbag in a front-rear direction of a vehicle body is reduced; and
   forming a portion of the airbag, where the predetermined dimension is left after being folded, to be bendable as a flexible part.

10. A method of folding an airbag for an airbag device in a vehicle, comprising:
    folding a left edge of an airbag and a right edge of the airbag in one of an accordion-folded manner and a rolling manner, while leaving a predetermined dimension in the vehicle width direction between left and right folded parts so that the size of the airbag in a vehicle width direction is reduced when the airbag is installed in the vehicle;
    folding a front edge of the airbag and a rear edge of the airbag in one of an accordion-folded manner and a rolling manner so that the size of the airbag in a front-rear direction of a vehicle body is reduced; and
    forming a portion of the airbag, where the predetermined dimension is left after being folded, to be bendable as a flexible part.

11. An airbag device for a vehicle, the airbag device comprising:
    airbag means for protecting a rider of the vehicle; and
    housing means for housing said airbag means, said housing means including a concave shape surface facing a steering stem and is configured behind the steering stem so as to cover a rear of the steering stem with the concave shape surface,
    wherein said airbag means corresponds to a shape of an inner peripheral surface of the housing means having the concave shape surface.

12. The airbag device for a saddle-ride type vehicle according to claim 11, wherein the concave shape surface comprises two surfaces intersecting each other at a center of the surface in a vehicle width direction.

13. The airbag device for a saddle-ride type vehicle according to claim 11, wherein the concave shape surface comprises a curved surface.

14. The airbag device for a saddle-ride type vehicle according to claim 11, wherein said airbag means including a left edge, a right edge, an front edge, and a rear edge,
    wherein the left edge and the right edge of the airbag are folded in one of an accordion-folded manner and a rolling manner leaving a predetermined dimension in a vehicle width direction between left and right folded parts so that the size of the airbag in the vehicle width direction is reduced;

wherein the front edge and the rear edge of the airbag are folded in one of an accordion-folded manner and a rolling manner so that the size of the airbag in a front-rear direction of a vehicle body is reduced; and wherein the housing means for housing the airbag means is bent at a flexible part formed at a portion where the predetermined dimension is left after being folded.

* * * * *